United States Patent
Nordin et al.

(12) 
(10) Patent No.: US 10,557,647 B2
(45) Date of Patent: *Feb. 11, 2020

(54) METHOD FOR CONVEYING CONCENTRATED SOLAR POWER

(71) Applicant: RODLUVAN INC, Raleigh, NC (US)

(72) Inventors: Kenneth Nordin, Bratislava (SK); Mats Olof Erik Mattsson, Oviken (SE)

(73) Assignee: Rodluven Inc., Southern Pines, NC (US)

( * ) Notice: Subject to any disclaimer, the term of this patent is extended or adjusted under 35 U.S.C. 154(b) by 320 days.

This patent is subject to a terminal disclaimer.

(21) Appl. No.: 15/687,864

(22) Filed: Aug. 28, 2017

(65) Prior Publication Data

US 2018/0073776 A1    Mar. 15, 2018

Related U.S. Application Data

(63) Continuation-in-part of application No. 15/477,136, filed on Apr. 3, 2017, now Pat. No. 10,267,538, which is a continuation-in-part of application No. 15/349,774, filed on Nov. 11, 2016, now Pat. No. 10,234,173.

(Continued)

(51) Int. Cl.
| | |
|---|---|
| *F24S 20/61* | (2018.01) |
| *F24S 50/80* | (2018.01) |
| *F24S 90/00* | (2018.01) |
| *F24S 30/428* | (2018.01) |
| *F24S 60/00* | (2018.01) |
| *F24S 23/30* | (2018.01) |
| *F24S 20/20* | (2018.01) |
| *F22B 1/00* | (2006.01) |
| *F24S 23/79* | (2018.01) |
| *F24S 23/71* | (2018.01) |

(Continued)

(52) U.S. Cl.
CPC .............. *F24S 50/80* (2018.05); *F22B 1/006* (2013.01); *F24S 20/20* (2018.05); *F24S 23/12* (2018.05); *F24S 23/30* (2018.05); *F24S 23/71* (2018.05); *F24S 23/79* (2018.05); *F24S 30/428* (2018.05); *F24S 30/45* (2018.05); *F24S 60/00* (2018.05); *F24S 90/00* (2018.05); *Y02B 10/20* (2013.01); *Y02E 10/41* (2013.01); *Y02E 10/42* (2013.01); *Y02E 10/47* (2013.01)

(58) Field of Classification Search
CPC . F26A 20/61; F24S 20/20; F24S 23/12; F24S 30/45; F23S 23/30
USPC ......... 126/656–657, 698–699, 600–608, 685
See application file for complete search history.

(56) References Cited

U.S. PATENT DOCUMENTS

| | | | | |
|---|---|---|---|---|
| 4,267,824 A | * | 5/1981 | O'Halloran | ............. F24S 23/00 126/601 |
| 4,447,718 A | * | 5/1984 | Mori | ..................... G01S 3/7861 250/203.1 |

* cited by examiner

*Primary Examiner* — Vivek K Shirsat
(74) *Attorney, Agent, or Firm* — Fasth Law Office; Rolf Fasth

(57) ABSTRACT

The method is for conveying solar power from a sun. A solar concentrator conveys and concentrates solar power as rays into a glass rod. The solar concentrator has a tapering device disposed at a bottom thereof. The glass rod has a first curved glass loop section, a second curved glass loop section and a straight glass section. The straight glass section has an outer end that is positioned in proximity to a water surface to heat the water. The first loop section is rotated relative to the second loop section at a first gap and the second section is rotated relative to the curved section at a second gap so that (Continued)

the concentrator can follow the path of the sun during the day.

4 Claims, 13 Drawing Sheets

Related U.S. Application Data

(60) Provisional application No. 62/394,881, filed on Sep. 15, 2016.

(51) Int. Cl.
*F24S 30/45* (2018.01)
*F24S 23/00* (2018.01)

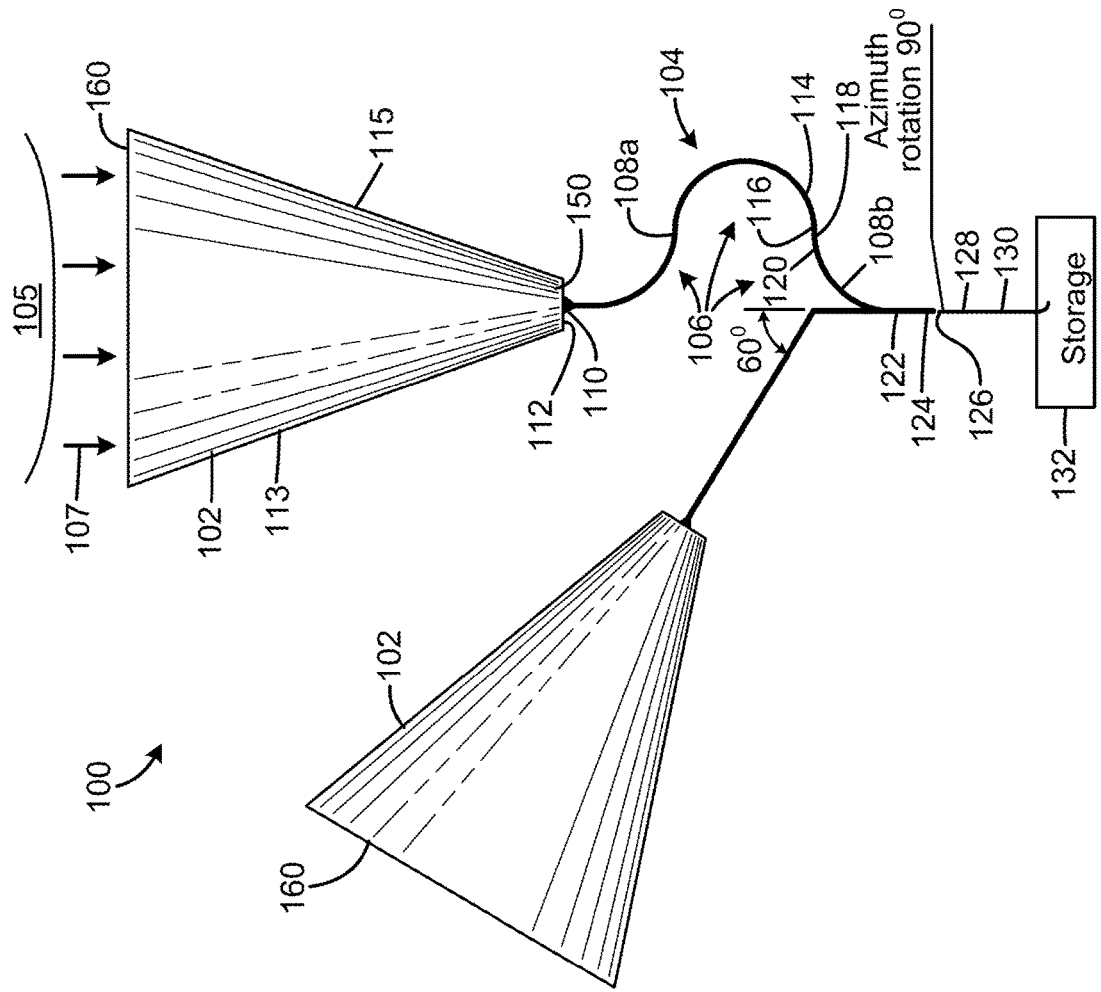
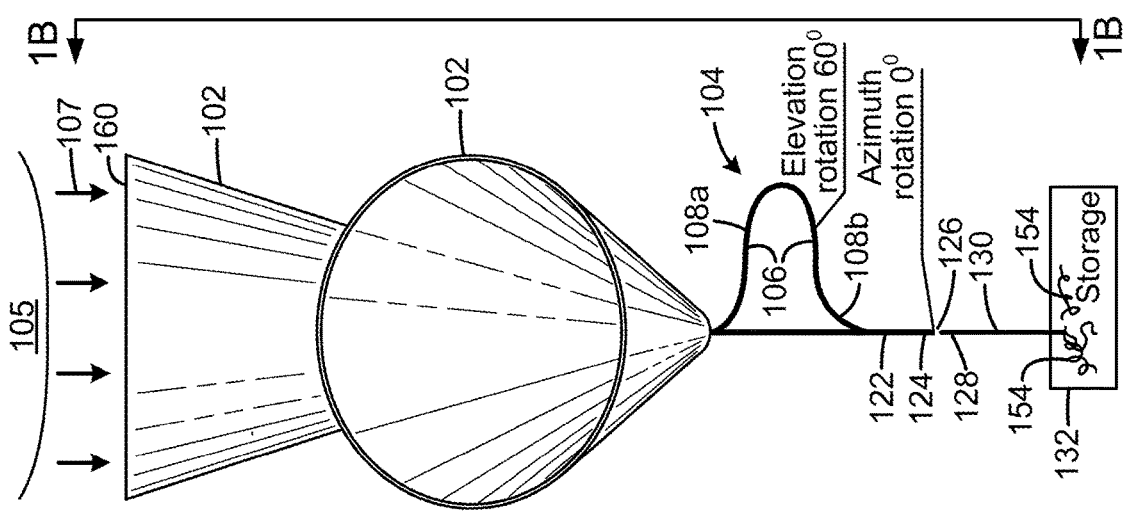

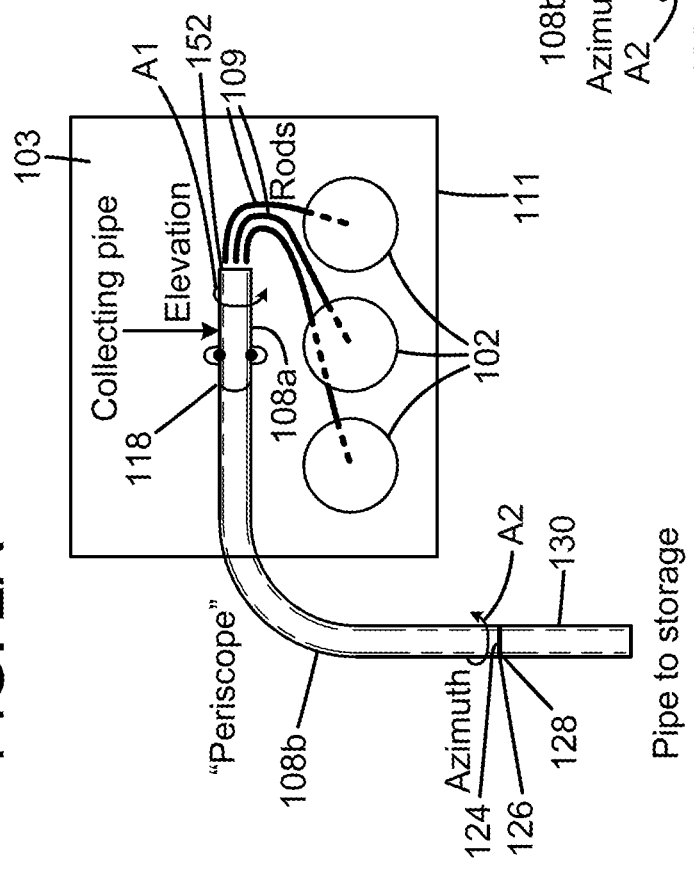
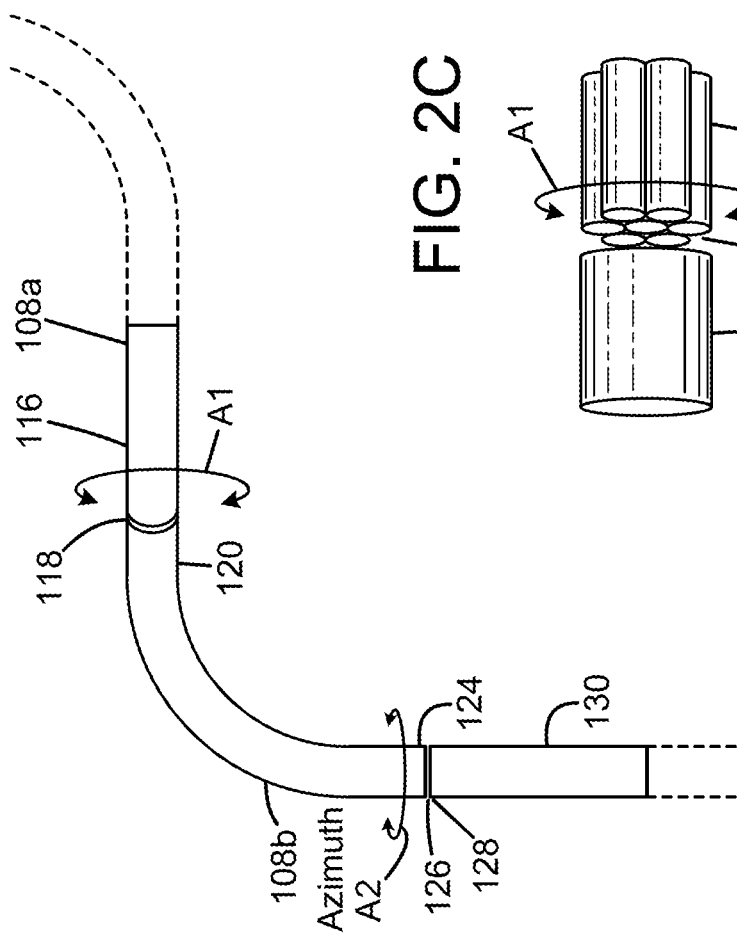
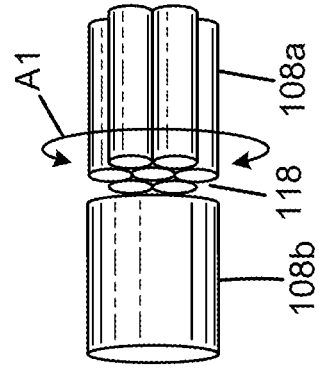

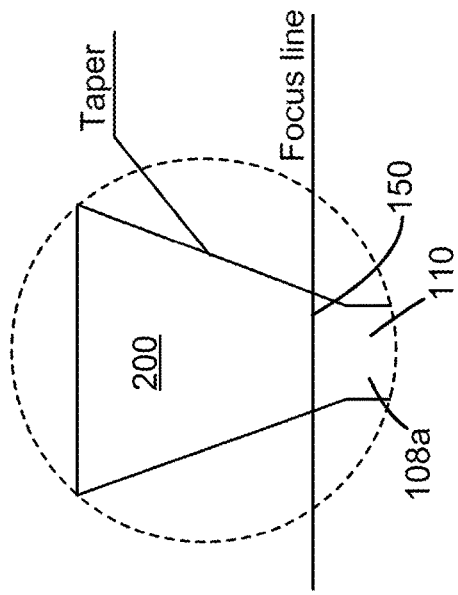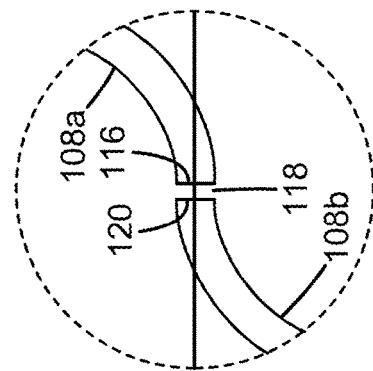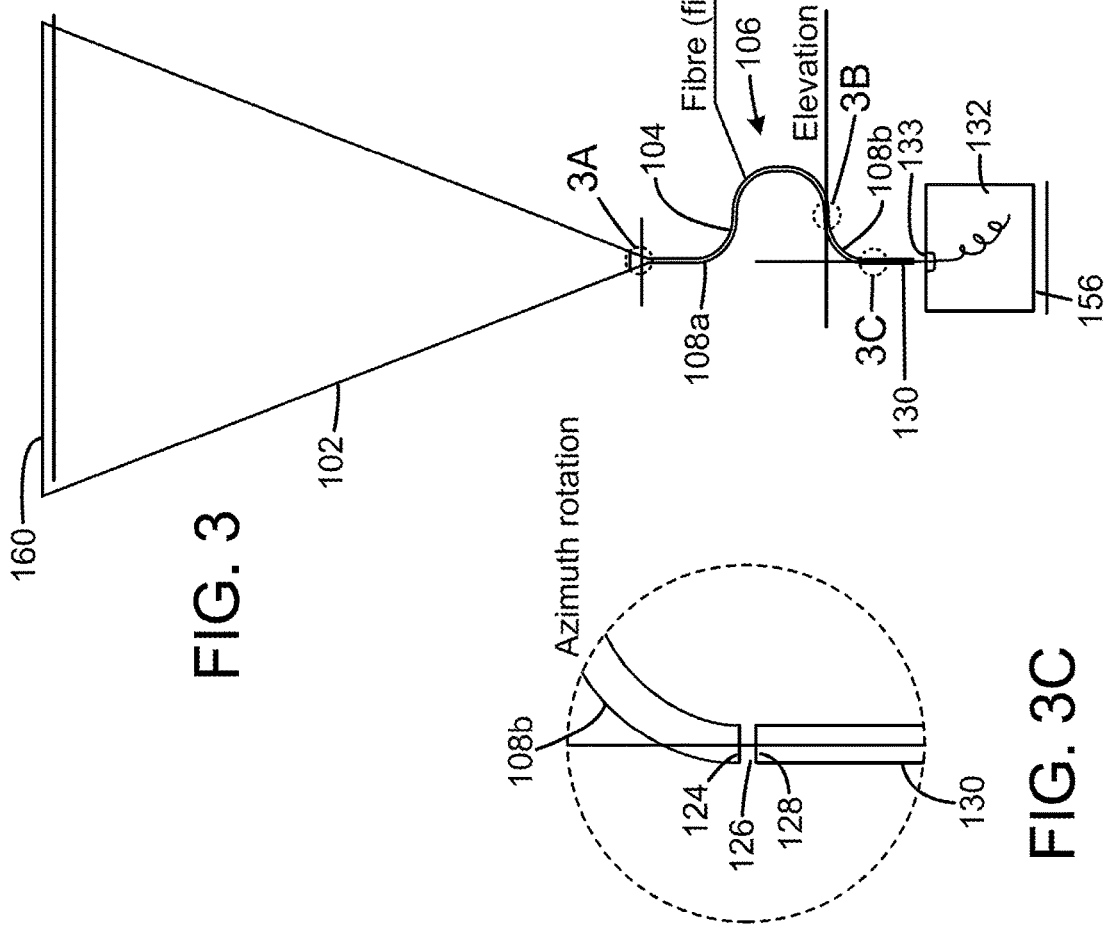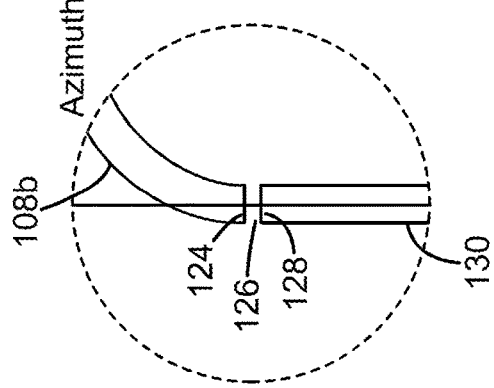

Sun at zenith

METHOD FOR CONVEYING CONCENTRATED SOLAR POWER

PRIOR APPLICATIONS

This is a continuation-in-part patent application that claims priority from Continuation-In-Part patent application Ser. No. 15/477,136, filed 3 Apr. 2017 that claims priority from U.S. patent application Ser. No. 15/349,774, filed 11 Nov. 2016, that claims priority from U.S. Provisional Patent Application No. 62/394,880 filed 15 Sep. 2016.

TECHNICAL FIELD

The invention relates to a method for conveying concentrated solar power.

BACKGROUND AND SUMMARY OF THE INVENTION

Solar power or solar energy has been used for many decades for heating dwellings and water and for generating electricity. Because solar power is a renewable energy source much effort has been made to develop systems to use such energy. The costs have been high and the storage of energy has not been very effective. A significant problem is the need for effectively positioning solar concentrators relative to the sun as the sun moves during the day. The best thick plastic-fibers available in the market have been studied but none of these provided the required level of optical transmission in the near-infrared (NIR) and a large fraction of the incident energy is lost in the waveguides after only a few meters propagation. The efficiencies of conventional systems have been low and there is a need for a more efficient and cost-effective system.

The method of the present invention provides a solution to the above-outlined problems. More particularly, the present invention relates to a solar power system that has a solar concentrator that has a lens disposed therein. The solar concentrator has a first cone-shape and a bottom. The solar concentrator has a length (l) that is longer than a width (w) at the lens of the solar concentrator. A solid tapering device is disposed at the bottom and has a second cone-shape. The tapering device has a bottom in operative engagement with a first curved glass loop section of a glass rod. The glass rod has a second curved glass loop section and a straight section. The first curved loop section and the second curved glass loop section have a first gap defined therebetween. The second curved glass loop section and the straight glass section have a second gap defined therebetween. The solar concentrator is adapted to receive solar power as rays and conveys and concentrates rays as light towards a focus line or segment at the tapering device. The tapering device is in communication with an upper end of the first curved glass loop section. The first curved glass loop section conveys the light to the second curved glass loop section via and across the first gap. The second curved glass loop section conveys the light to the straight glass section via and across the second gap. While transmitting light, the first curved glass loop section is rotated relative to the second curved glass loop section at the first gap. The second curved glass loop section is rotated relative to the straight glass section at the second gap so that the solar concentrator follows a path of a sun. An outer end of the straight glass section is disposed in proximity to a water surface to heat the water below the water surface.

In an alternative embodiment, the outer end is disposed above the water surface.

In yet an alternative embodiment, the outer end is disposed above a water surface of water contained in a container and the water surface is maintained between a minimum level and a maximum level.

In an alternative embodiment, the light emitted from the outer end converts the water to steam that is conveyed from the container.

BRIEF DESCRIPTION OF DRAWINGS

FIG. 1A is a schematic front view of a solar power system of the present invention;

FIG. 1Bb is a schematic side view of the solar power system shown in FIG. 1 along line A;

FIG. 2A is a perspective view of a portion of the solar power system of the present invention;

FIG. 2B is a detailed perspective view of the gaps formed between the loop sections of the present invention;

FIG. 2C is a detailed perspective view of one of the gaps of the present invention;

FIG. 3 is a front elevational view of the solar power system of the present invention;

FIG. 3A is a front elevational view of the taper device;

FIG. 3B is a detailed view of the loop sections and the gap therebetween;

FIG. 3C is a detailed view of vertical loop sections and the gap therebetween;

DETAILED DESCRIPTION

Figure 4:
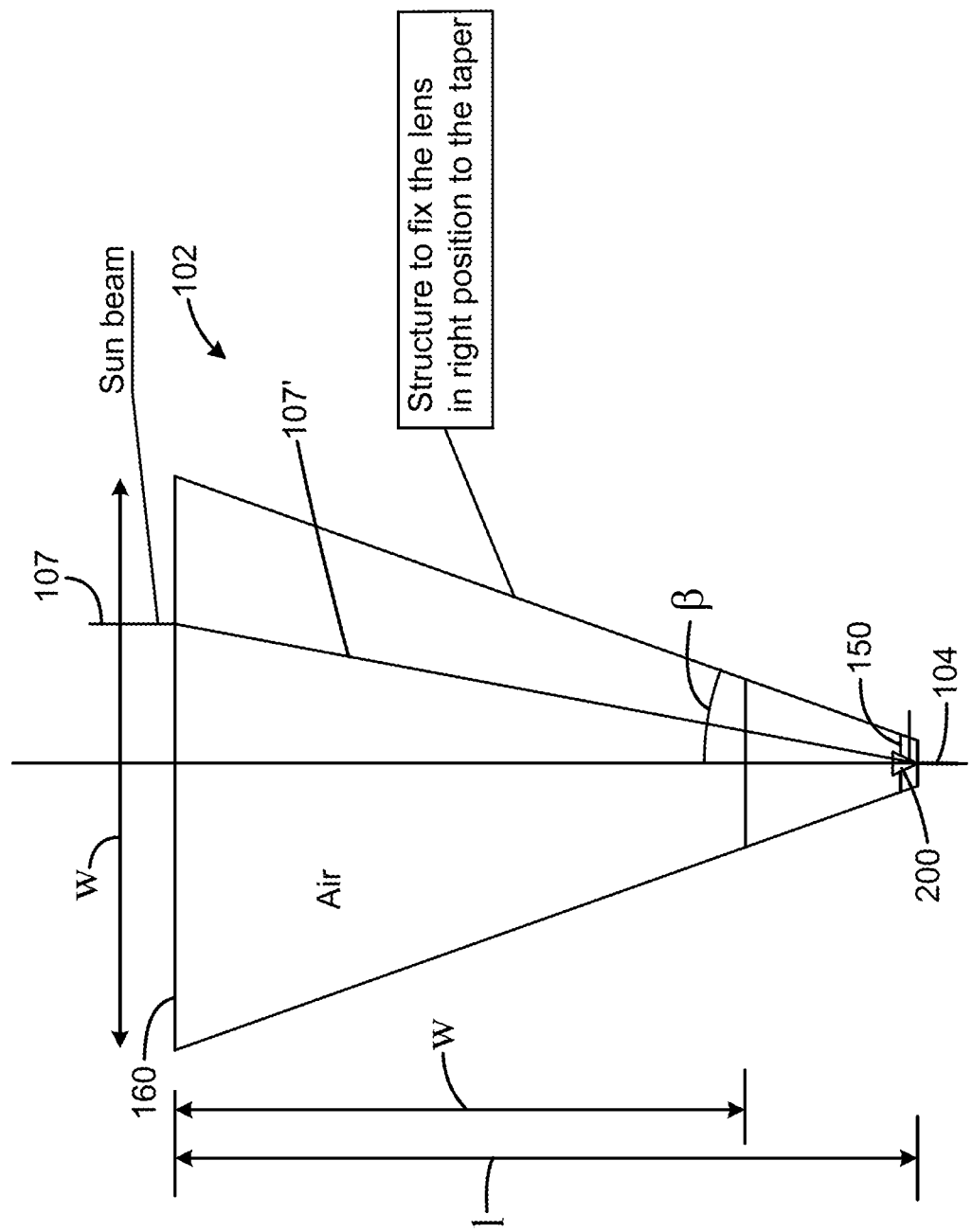
FIG. 4 is a front elevational view of the passage of the solar rays through the solar concentrator.

FIGS. 1a-1b are schematic overviews of the solar power system 100 of the present invention. As described in detail below, one important feature of the present invention is that the solar concentrator 102 is rotatable in two directions so that it is not necessary to use light transmitting fiber optic materials that are bendable as the panel 111 (best seen in FIG. 3) moves with the path of the sun 105. The system 100 has conical-shaped or tapered solar concentrators 102 that concentrate beams or rays 107 received from the sun 105 and convey the light beams 107 to a tapering or taper device 200 that is in communication with and connected to a glass rod 104 (best seen in FIG. 4). The glass rod 104 may be made of a suitable silica or doped glass material. The glass rod 104 could be flexible but with the current technology, it is only possible to make flexible cables that are 1.5 mm or smaller and when the cable is bent too much the light cannot propagate in the cable without losses. The glass rod 104 should preferably be greater than 1.5 mm and more preferably about 6 mm in diameter and the glass rod 104 can be stiff, as explained in detail below, due to a periscope mechanism that enables the glass rod section to be moved relative to one another. It should be understood that the present invention is not limited to 6 mm glass rod and that larger glass rods such as 6-60 mm diameter glass rods may also be used. One function of the solar concentrator 102 is to concentrate the rays 107' to a focus segment 150. The tapering device 200 then further concentrates the rays 107" further to the diameter of the glass rod 104 so that less glass or silica can be used in glass rod 104. When the concentrator 102 and tapering device 200 are correctly dimensioned, the amount of glass/silica used in the glass rod 104 can be reduced with up to 90%. The upper surface 204 of the tapering device 200 could be positioned at the focus segment 150 but in the preferred embodiment the upper surface 204 is placed above the focus segment 150 and made wider than the length (K) of the focus segment to accommodate for inaccuracies in the construction of the solar concentrator 102 and its lens 160. The conical shape of the tapering device 200 is unique to accomplish a total internal reflection of the light inside the tapering device 200 and so that the light can propagate inside the tapering device 200 without substantial loss of light through the side walls 218, 220 of the tapering device 200. Preferably, the upper surface 204 of the tapering device 200 is treated with an anti-reflective substance to minimize losses of light.

It is to be understood that many solar concentrators 102 may be used in a panel 111, as shown in FIG. 2a. The solar concentrator 102 has a suitable lens 160, such as Fresnel lenses or a solar guiding system, to concentrate the sunrays 107 to the focal line or focal segment 150. The focal segment 150 may be treated as a mirror image of the width of the sun 105 as seen at the focal segment 150. There is an error of about 0.5° at the outer edges of the focal segment 150 due to the dimension of the sun. In one preferred embodiment, when the lens 160 of concentrator 102 is about one square meter at the upper end thereof then the focal segment 150, after the concentration of the sun rays by the lens, has a diameter of about 20 millimeters. It should be noted that when the width and the length of the solar concentrator 102 are the same, the focal segment 150 is shortest i.e. about 18 mm when the width and length of the solar concentrator 102 are about 1 meter. However, as explained below, although it is desirable to make the focal segment 150 as short as possible to minimize the amount of glass needed in the glass rod 104, it has surprisingly been realized that the focal segment should be larger than the minimum 18 mm. This is accomplished by designing the solar concentrator 102 with a length (l) that is longer than its width (w) at the upper end of the solar concentrator 102 wherein the lens 160 is located.

The glass rod 104 may be made of doped glass or another suitable fiber optic material that includes a carbon pattern that can handle all the visible wave-lengths of the sun light or sun rays received by the concentrator 102. Infrared and other invisible wavelengths could also be used. In general, the visible wave-lengths have the most energy and are the most desirable to convey. In this way, it is possible to effectively transport the sun rays or light of different wave-lengths via the glass rod 104. The glass rod 104 may be non-bendable and carries the light at a range of visible (and non-visible) wave-lengths. Instead of using the glass rod 104, it is also possible to use solid glass in the fibers although the energy losses are greater, the range of wave-lengths that can be carried is more limited and it may be necessary to use relatively thick glass rods which are difficult or impossible to bend without breaking the rods. Preferably, high purity silica should be used in the glass rod 104. However, as indicated above, large diameter silica is not flexible. It was discovered that a two-axis rotation of the solar concentrator 102 makes it possible to track the azimuth and elevation of the sun 105 in the sky to optimize the energy captured by the solar concentrators 102. The glass rod 104 may include a plurality of glass rods connected to solar concentrators 102 that are tightly packet such as up to 36 glass rods that are placed in a framework 103 of a panel 111. The coupling of light from up to 36 rods into a glass periscope is accomplished by leading each rod into a hub 152 (best seen in FIG. 2a). The bundling of the plurality of rods 109 is best shown in FIGS. 2a-2c. The rods could be attached to the panel with Fresnel lenses and because of the elevation of the sun, the entire panel with the rods should be able to face the horizon at sunrise and sunset and zenith for low latitudes.

By using a solar concentrator 102 in combination with the tapering device 200, the number of glass rods included in glass rod 104 could be reduced to one or a few rods. The lens 160 of the solar concentrator 102 enables the rays 107 to be concentrated to the focal segment 150.

An important feature of the present invention is that the glass rod 104 has a periscope section that includes a curved loop segment 106 that is divided into a first curved glass loop section 108a and a second curved glass loop section 108b. The first loop section 108a has an upper end 110 in operative engagement with or connected to a tapering device 200 that is preferably disposed in the concentrator 102 at a bottom 112 thereof. More preferably, the tapering device 200 is located at or near a focal point of the lens 160 that does not necessarily have to be at the bottom of the concentrator 102. The section 108a has a lower end 114 terminates at an end surface 116. The end surface 116 is aligned with but separated by a first gap 118 from an upper end surface 120 of the second loop section 108b. The end surfaces 116 and 120 are preferably treated with an anti-reflective substance to minimize losses of light. The loop section 108b has a lower end 122 that terminates at an end surface 124. The loop sections 108a and 108b together form a somewhat U-shaped loop segment 106. The end surface 124 is aligned with but separated by a second gap 126 from an upper end surface 128 of a straight glass rod section 130 that is directly or indirectly connected to a high-temperature storage system or unit 132 and preferably extends into an inside of the storage unit 132. It is of course possible not to use a storage unit 132 and to lead the light into another substance such as water. The end surfaces 116, 120; and 124, 128 are preferably treated with anti-reflective layers to minimize losses of light. Preferably, the end surfaces 116, 120; and 124, 128 should be so close to one another, such as less than 1 mm, that even sunbeams that have been reflected by the end surfaces can be transmitted or propagated across the gap from one section to another section. It is preferable that the end surfaces of each loop section remain parallel as the concentrator 102 is moved i.e. the gaps 118 and 126 should not change in shape as the concentrator 102 is moved.

The storage unit 132 may have a sapphire window 133, that lets the light carried in the glass rod 130 through, where the glass rod section 130 enters the storage unit 132 to reduce heat losses so that the glass rod section 130 terminates just above the sapphire glass 133 (see FIG. 3) that could handle temperatures in the range of 1800° C. The storage unit 132 may also include a rotatable lock that can be rotated to follow the sun during the day. The storage system may include a suitable high temperature resistant material such as MgO that can handle 1000° C. while maintaining mechanical integrity. The glass rod section 130 may be helically shaped or have any other form inside the storage unit 132.

The rotation at the second gap 126 enables the concentrator 102 to accompany the sun's azimuth during the day i.e. to follow the sun 105 as the sun moves during the day. The rotation at the first gap 118 enables the concentrator to accompany elevational changes of the sun 105 during the day. It is also possible to leave out the second gap 126 and to instead rotate the solar concentrator 102 relative to the section 108a. It may also be possible to rotate section 130 relative to the storage unit 132.

In this way, the glass rod 104 and glass rod section 130 carry the conveyed light energy collected in the concentrator 102 to the inside of the storage unit 132. The concentrator 102 can, in this way, be directed towards the sun and follow the path of the sun without using bendable glass rods. This in turn means larger diameter glass rods that are not bendable may be used. In the storage unit 132, the light is converted to heat upon impact with the material inside the storage unit 132. The storage unit 132 may be made of any suitable material such as concrete, sand or any other material that is suitable for storing heat in a range of 300-1000° C. Preferably, the temperatures are higher than 300° C. in order to make electricity.

Because there is the first gap 118 between the first loop section 108a and the second loop section 108b, the first loop section 108a is rotatable relative to the second loop section 108b. In this way, the concentrator 102 may be moved from an upright position to a sloping position (pointing towards the viewer), as shown in FIG. 1a. Similarly, because there is a second gap 126 between the second loop section 108b and glass rod section 130, the second loop section 108b is rotatable relative to glass rod section 130 so that the concentrator 102 may, for example, be turned sideways, as best shown in FIG. 1b. This enables the movement of the concentrator 102 without bending any of the loop sections of glass rod 104. In this way, the concentrator 102 can be moved and adjusted to the location of the sun relative to the earth. It is to be understood that the concentrator 102 is also supported by a frame to prevent it from falling to the ground. FIGS. 2a and 2b show detailed views of the loop sections 108a and 108b and the gaps 118, 126 defined therebetween. The ability to rotate section 108a relative to section 108b is illustrated by the round arrow A1 in FIG. 2b and FIG. 2c. The ability to rotate section 108b relative to section 130 is illustrated by round arrow A2 in FIG. 2b.

FIG. 3 is a forward elevational view of the system 100 wherein section 108a is attached to bottom 112 that is located below focal segment or focus line 150. FIG. 3A is a front elevational view of the taper device 200. FIG. 3B is a detailed view of the loop sections 108a, 108b and the gap 118 therebetween. FIG. 3C is a detailed view of loop sections 108b and 130 and the gap 126 therebetween.

FIGS. 1a-1b show cross-sectional side views of the storage unit 132. The glass rod section 130 can be connected to relatively long spiral-formed glass-rods 154 disposed inside the storage unit 132. It is also possible to direct the light directly from the solar concentrator 102 via the air to the ends of the glass-rods that extend out of the storage unit 132. One drawback of the latter design is that the solar concentrator 102 should be relatively close to the storage unit and that the storage unit 132 must be unobstructed and visible from the solar concentrator. Another option is to use the solar power to heat gas that, in turn, is circulated into the storage unit 132 to heat the glass rods disposed in the unit.

The hot glass-rods convert the light energy, carried in the fiber glass rod 104 and section 130, to heat the storage unit 132. More particularly, as the rods 154 emit light inside the storage unit 132 the light energy is converted into heat. When the rods are substantially straight the light is reflected on the inside walls of the glass rod and no or very little light is emitted. However, when the glass rod is sufficiently bent or curved then light escapes from the glass rod. In other words, the light energy is mostly emitted where the rods are bent and this light energy is converted into heat inside the storage unit 132. The spiral shape of the rods 154 increases the contact surface area against the storage unit 132 to improve the transfer of heat from the glass-rods 154 to the storage unit 132. At the end of the rods 154 very little light energy remains so the end does not create much heat. As mentioned above, it is also possible to transfer the light energy from the solar concentrator 102 directly to the storage 132 by directly directing or reflecting the light energy to the glass-rods 154 that are sticking out of the storage unit 132. In this way, the glass rods 154 are heated. A straight rod, shaped like a cone, also works but makes it more difficult to accomplish an even energy distribution in the storage unit. It is important to realize that, in the present invention, the light is not converted to heat until it impacts the storage unit which means the glass rod is not heated by the solar energy. The conversion to heat does not occur until the light impacts the material inside storage unit 132. Also, it is important to realize that, in the present invention, the solar energy is not used to directly heat a flow of a medium such as gas. Instead, the light is, preferably, first converted to heat inside the storage unit to heat the storage unit (i.e. not a gas flow) that, in turn, may be used to heat gas 156 or any other medium that flows outside the storage unit 132.

FIG. 4 is an elevational view of the solar concentrator 102 connected to the glass rod 104 and shows how the solar beams 107 pass through the lens 160 disposed at the top of the solar concentrator 102 and into a tapering unit 200 disposed at the bottom of the solar concentrator 102. The concentrator 102 has a width (w) and a length (l). In general, it has been believed that the length (l) should be as short as possible relative to the width (w) to shorten the length of the focus line or segment 150 and to minimize the size of the concentrator 102. However, it was surprisingly discovered that the length (l) of the concentrator 102 should be greater than the width (w) although the length (K) of the focus segment 150 becomes longer and the size of the concentrator increases and it makes it more difficult to hold the concentrator 102 in place in a frame. The modification of using a length that is longer than the width thus makes the focus segment longer. For example, the width may be about 1 meter and the length about 1.3 meters. As seen in FIG. 4, the lens 160 changes the direction of the sun beam 107 as it passes through the lens 160 and is directed towards tapering unit 200 disposed at the bottom of the solar concentrator 102. Preferably, the angle (@) should be less than 30° or more preferably about 20-22° by increasing the length (l) of the solar concentrator 102 from length (w) to length (l), as shown in FIG. 4. The tapering unit 200 is then disposed at the bottom of concentrator 102 to further concentrate the sunbeams 107', as explained in detail below. After the sunbeams 107 have passed lens 160 they are marked as 107' in the figures. Surprisingly, the length of the focus line 150 only increased from about 18 mm to about 20 mm when the length (l) was made 30% longer relative to the width (w). The tapering unit 200 then reduces the focus line from 20 mm to about 6 mm at the bottom surface 206. Although it would be enough to use tapering unit 200 with a width of 20 mm, it is preferable to use a tapering unit 200 that has a width of about 40 mm at the top surface 204 to accommodate for any misalignment of the top surface 204 and the lens 160. One preferred feature is that the tapering unit 200 is congruent with the downwardly directed and truncated triangular or conical shape of the solar concentrator 102 so that the sides 218, 220 of the tapering device 200 are parallel with the sidewalls 113, 115 of the solar concentrator 102. The use of the lens 160 in combination with the tapering device 200 reduces the amount glass needed in the glass rod 104 with about 90%. One drawback of the lengthened solar concentrator 102 is that the reflection angles inside the glass rod 104 increase.

Figure 5:
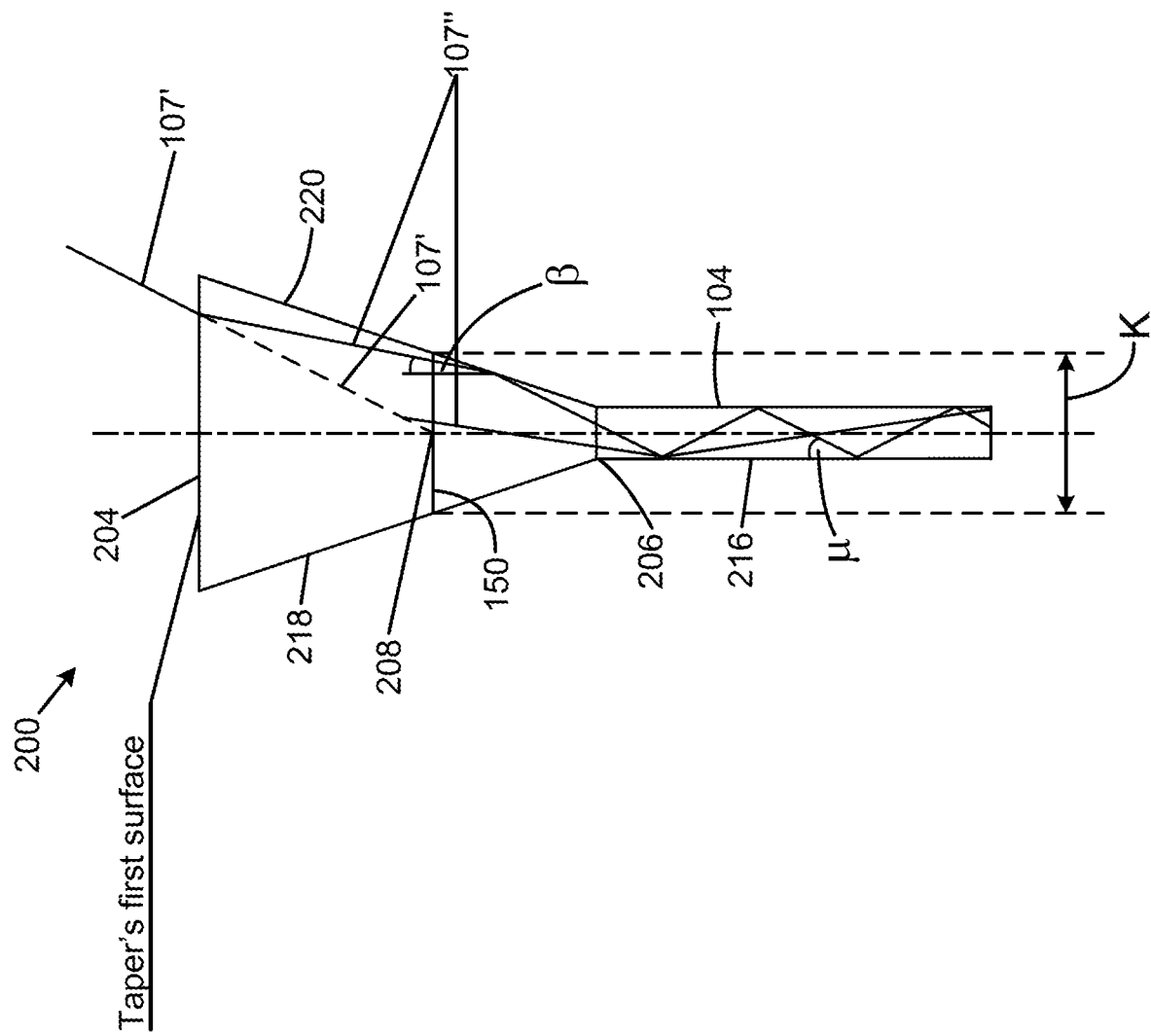
FIG. 5 is a front elevational view of the tapering unit connected to the glass rod.

FIG. 5 is an elevational view of the tapering unit 200 (disposed inside solar concentrator 102) connected to glass rod 104. As mentioned above, unit 200 has, preferably, the same shape as concentrator 102 i.e. the length is longer than the width and has a conical or triangular shape with a truncated bottom surface that is connected to the glass rod 104. The unit 200 is preferably solid and made of silica or doped glass. The tapering unit 200 has the top surface 204 and the bottom surface 206. Preferably, the top surface 204 is treated with a suitable anti-reflection substance to reduce undesirable reflections of the sunbeams. The length of the top surface 204 is designed to be a bit longer than what is theoretically necessary in case the lens 160 and the tapering device 200 are not perfectly aligned. When perfectly aligned, the top surface 204 would only have to have a width that corresponds to the width of the focal segment 150 that in turn is dependent upon the lens 160 and the shape of the solar concentrator 102. The unit 200 has a theoretical focal position 208 on focal segment 150 had the sun beam 107' continued to travel in the air inside solar concentrator 102 (as indicated by the dashed line 107') without passing into the unit 200. The top surface 204 of the unit 200 causes the sun beam 107' to change the direction as shown by sunbeam 107" similar to when light passes through a lens. The beam 107" inside unit 200 bounces or is reflected off side walls 218, 220 of unit 200.

An important feature is that the reflection angle beta (β) must be 30° or less otherwise the beam 107" cannot properly enter glass rod 104 without bouncing back and forth at the inlet without going into glass rod 104. The glass rod 104 is currently 6 mm in diameter and if angle β is 30° or slightly greater then glass rod 104 must be 10 mm or greater to prevent loss of the beam inside the glass rod 104. This is disadvantageous because it means more glass must be used in glass rod 104 which makes it more expensive and extremely difficult to bend. Another important advantage of using an angle β that is less than 30°, more preferably about 22°, is that then the angle μ is not greater than about 40-41° because the angle μ must be less than the total internal reflection angle of the material of glass rod 104 i.e. so that the light can propagate in the glass rod without loss. This is important because when angle μ is greater than total internal reflection angle i.e. about 40-41°, the sun beam 107" passes through the outer wall 216 of glass rod 104. By making the focal segment 150 longer than necessary, the reflection angles β inside the tapering device 200 are reduced that in turn reduces the reflection angles μ inside the glass rod 104.

It is also important that the reflection angles inside the tapering device 200 are less than the total internal reflection angle (usually about 40-41°) to prevent the sun beam 107' from escaping through the sidewalls 218, 220 of the tapering device 200.

The surprising and unexpected effect of increasing the focus line or area 150 from 18 mm to 20 mm (by making the concentrator 102 elongate i.e. to have a length that is longer than its width) was thus that it was then possible to reduce the diameter of the glass rod 104 while maintaining the reflection angle to be less than the total internal reflection angle. Any angle greater than the total reflection angle means that light no longer can propagate within the tapering device 200 and glass rod 104 without escaping through the walls of the tapering device 200 and/or the glass rod 104.

Figure 6:
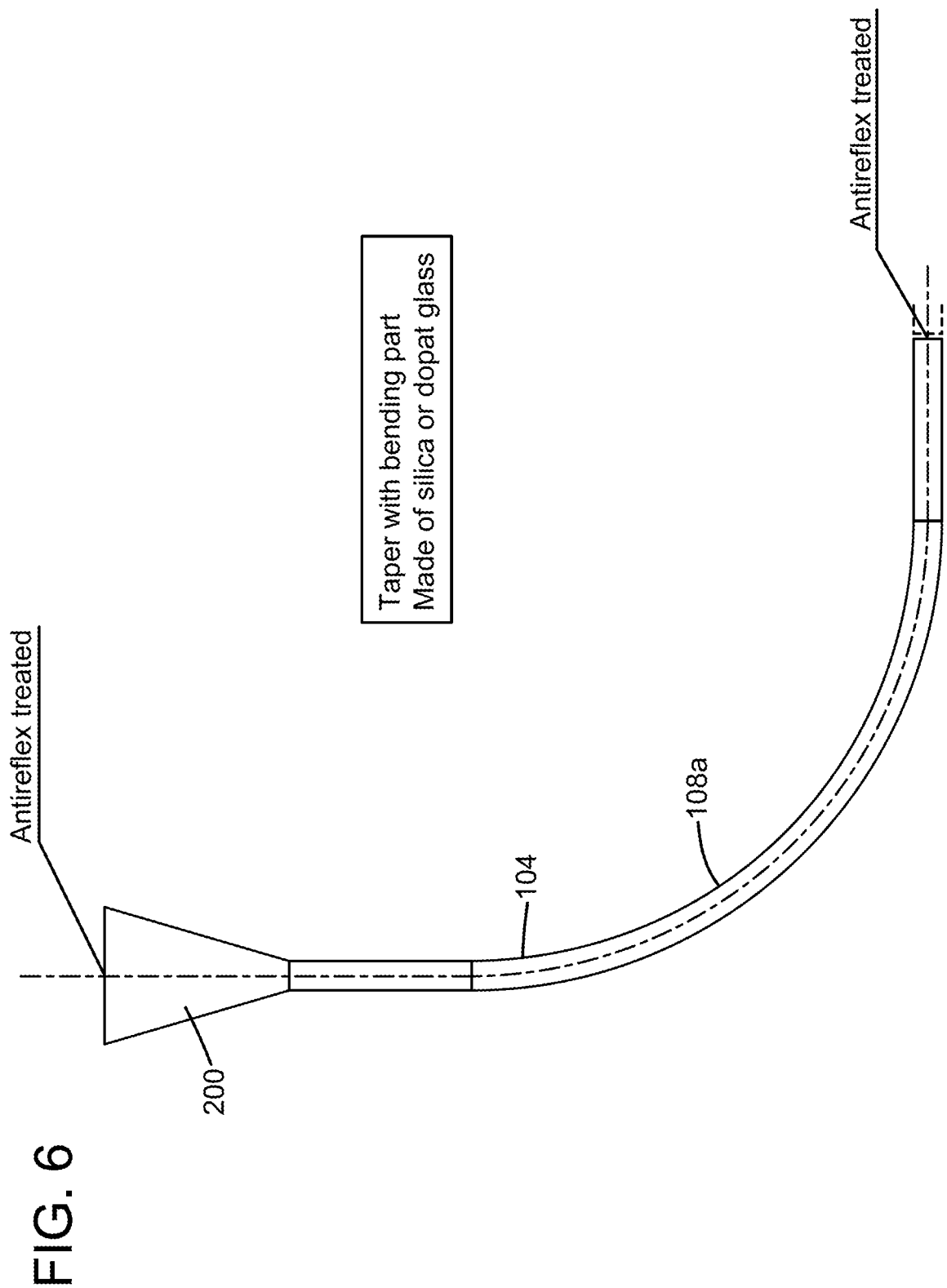
FIG. 6 is a front elevational view of the tapering unit connected to the curved glass rod.

As best shown in FIG. 6, because the angle @ is relatively large, or slightly above 40°, the radius of segment 108a must have a larger bending radius, compared to using a thicker glass rod 104 with a greater diameter, in order to reduce losses and to prevent the reflection angle from exceeding the total internal reflection angle in the glass rod 104. The bending radius of section 108 could be about 100 mm.

Figure 7:
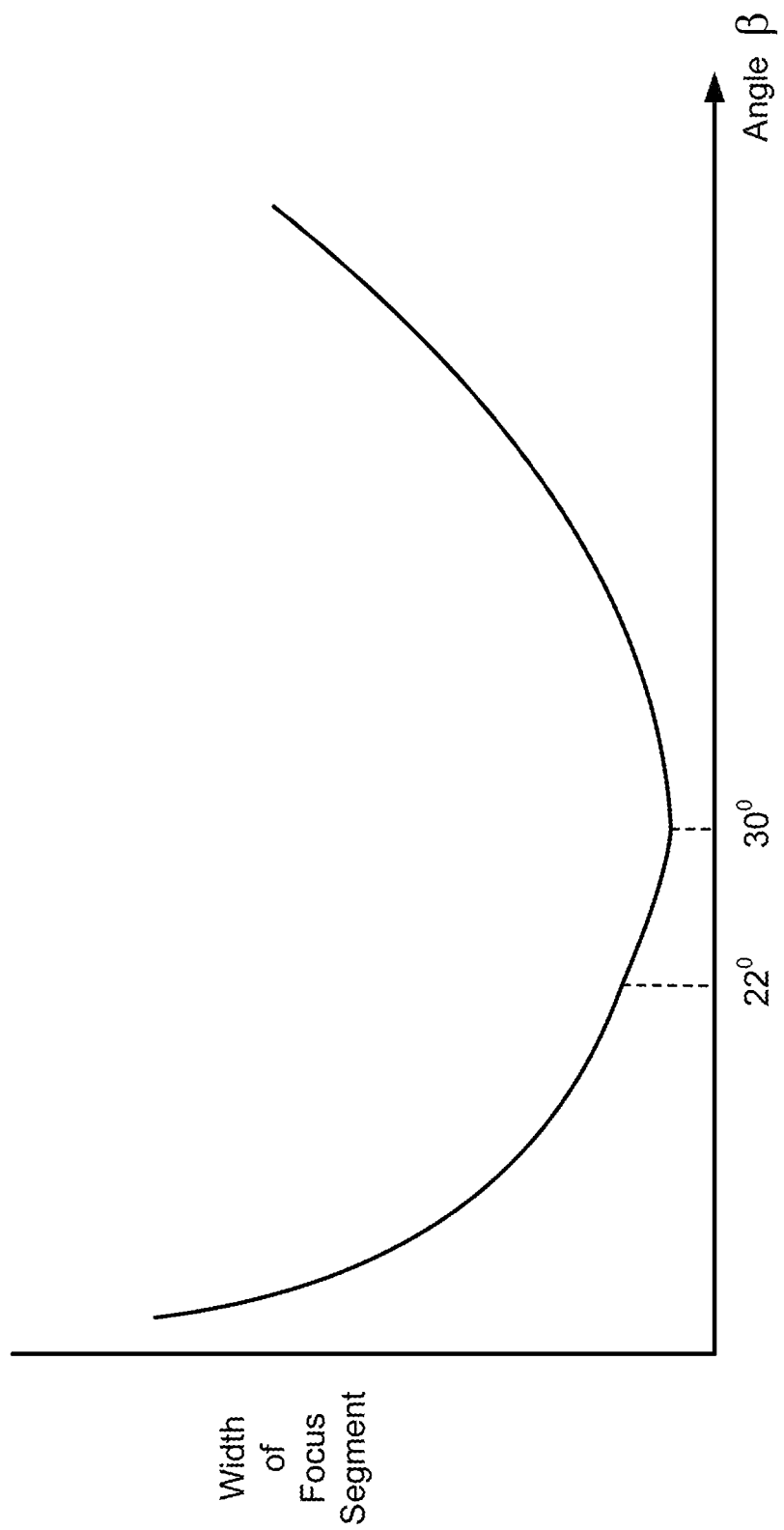
FIG. 7 is a graphic illustration of the correlation between reflection angle and size of focal segment.

FIG. 7 shows the relationship between the width or length of the focus segment 150 and the reflection angle β. The focus segment is the shortest when the reflection angle is 30° i.e. when the length (l) of the solar concentrator 102 is the same as the width (w). It was surprisingly discovered that by increasing the length (l) relative to the width (w) of the solar concentrator 102, the reflection angles inside the tapering device 200 where reduced to such an extent that that the reflection angles within the glass rod 104 also stayed within or below the total reflection angles of the glass rod 104. By using a length (l) of the solar concentrator 102 that is shorter than the width (w), the reflection angles increase to a value greater than 30° and the light passes through the walls of the tapering unit 200 and the glass rod 104 so that no or very little light can propagate therethrough.

Figure 8:
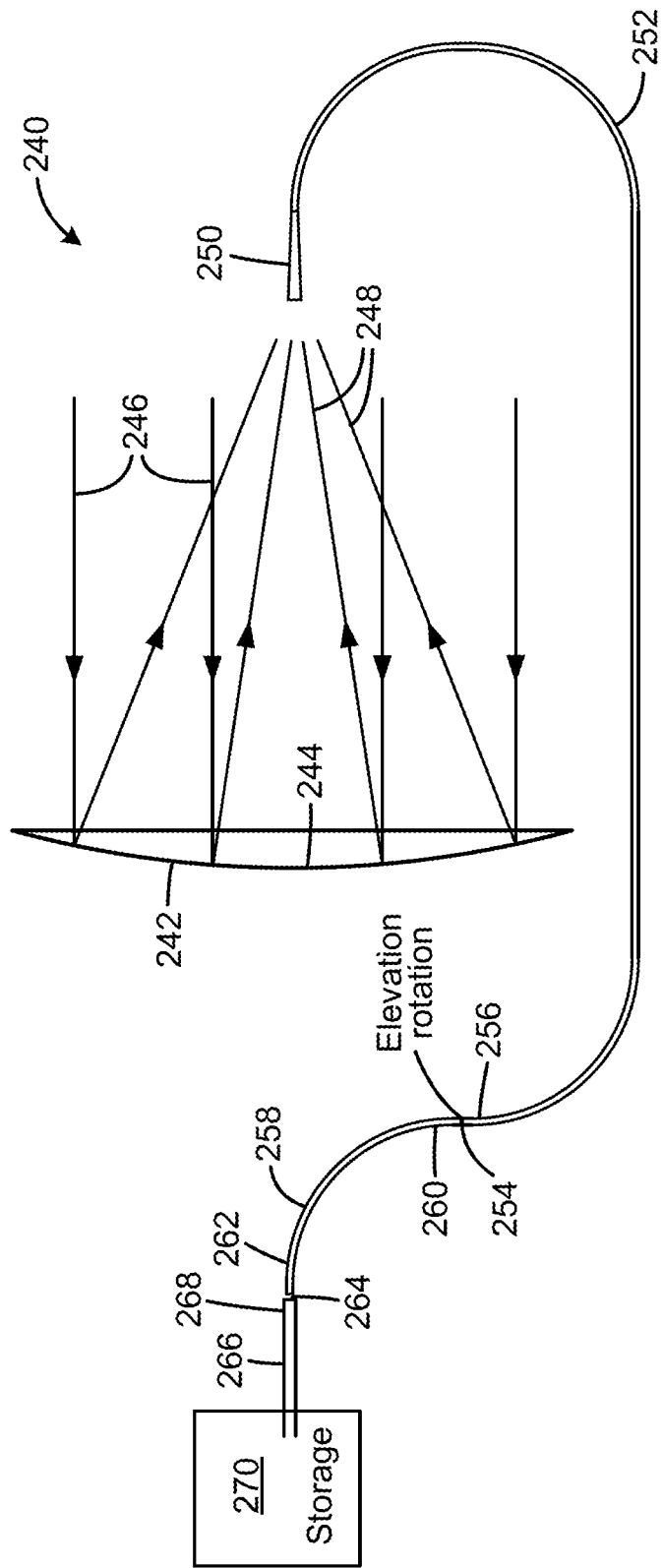
FIG. 8 is an elevational side view of a second embodiment of the present invention.

FIG. 8 is an elevational side view of a second embodiment of the solar power system 240 of the present invention. One advantage of system 240 is that it is relatively simple and that the light or sun rays are concentrated into the taper device without having to use lenses and extra mirrors. The words "light" and "sunrays" are used interchangeably herein. The system 240 has a parabolic reflector such as a mirror 242 that has a curved inside 244 that receives the sun rays 246 and reflects and concentrates the rays 248 directly back into a conical-shaped solid homogenous taper device 250 (without being reflected by an additional mirror or passing a lens) that is connected to a curved glass rod section 252 that terminates at a first gap 254 at a first elevation rotation point at an end 256. A curved glass rod section 258 has one end 260 at the gap 254 and another end 262 at a second gap 264. A rod section 266 has an end 268 at the second gap 264 and an opposite end terminating in a suitable place. The details of the various glass rod sections and gaps therebetween are virtually identical to the glass rod sections and gaps described in FIGS. 2A-2C. The taper device 250 is identical to the taper device 200 as described in detail above. The gaps must be such that light can be conveyed from one glass rod to another via the gap with minimum losses. Preferably, the rod section 266 extends into a storage unit 270 such as a solid concrete unit. The rod section 266 is adapted to convey and emit the light into an inside of the storage unit 270 wherein the light converts into heat upon impact with the storage unit 270 to heat the storage unit 270.

Figure 9:
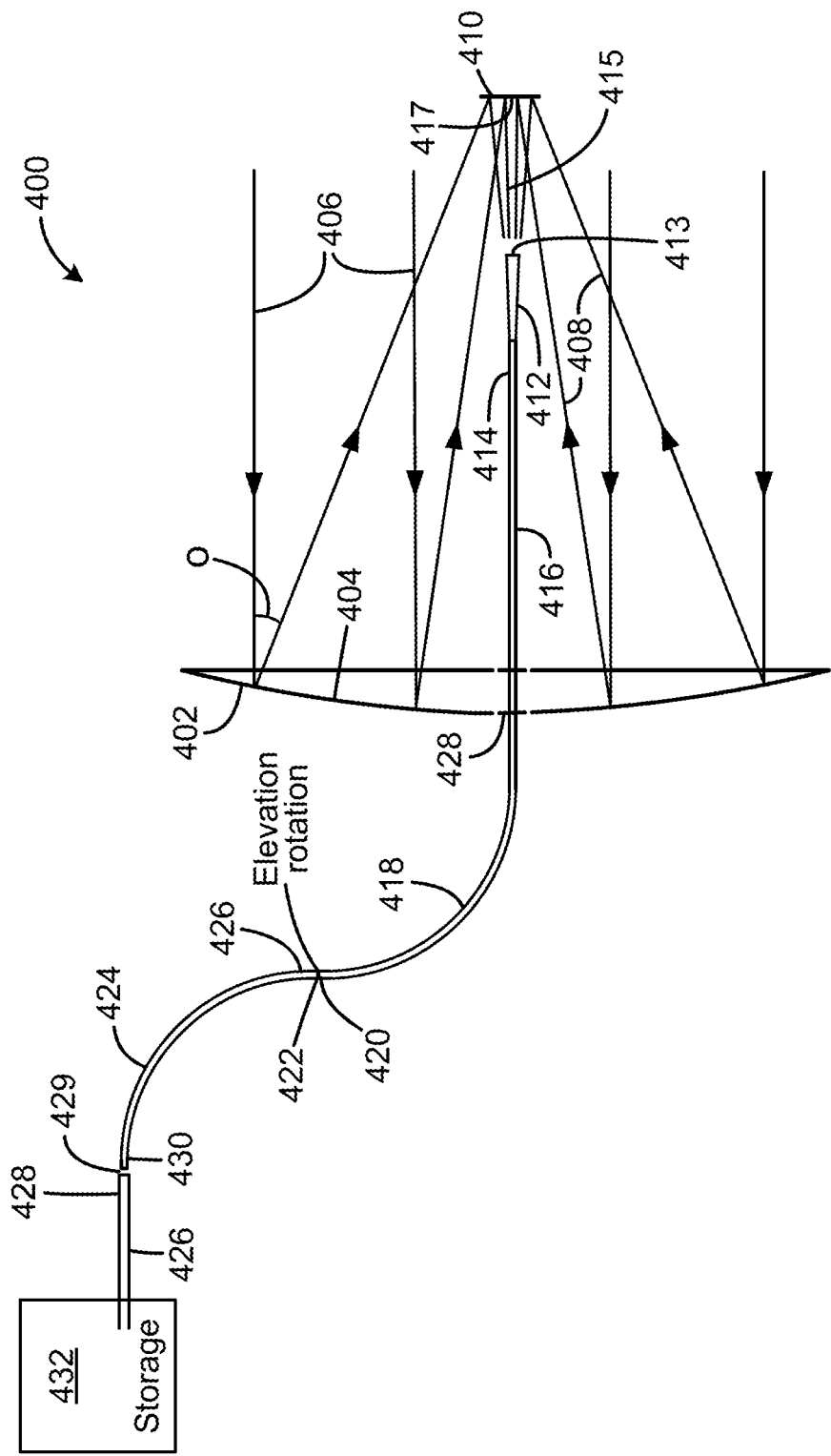
FIG. 9 is an elevational side view of a third embodiment of the present invention.

FIG. 9 is an elevational side view of a third embodiment of the solar power system 400 of the present invention. One advantage of system 400 compared to system 240 is that the second straight reflector/mirror could in some cases further concentrates the sun rays before they enter into the taper device. Another advantage is that the second mirror lowers the mechanical load on the tracking system, which makes tracking easier and cheaper. The second mirror also reduces the amount of glass needed. More particularly, the system 400 has a parabolic reflector such as a mirror 402 that has a curved concave inside 404 that receives the sun rays 406 and reflects the rays 408 back to into a straight vertical reflector or mirror 410 at an angle so that the mirror 402 concentrates the rays 408 to the mirror 410 and mirror 410 further concentrates the incoming rays 408 to rays 415 and reflects them into a taper device 412 (that is also identical to taper device 200). The end surface 413 of the taper device 412, that receives the concentrated rays 415 from the mirror 410, is smaller than a reflection area of the reflector or mirror 417. One end 414 of a glass rod 416 is connected to taper device 412 (as described above regarding the taper devices of the earlier embodiments). The glass rod 416 extends through a central segment or opening 428 of the parabolic mirror 402. The glass rod 416 has a curved section 418 that terminates at an end 420 at a gap 422 that functions as an elevation rotation point similar to the gaps described above. A second curved glass rod 424 has an end 426 terminating at the gap 422 so that light is and may be conveyed from the glass rod 416 to the glass rod 424 via the gap 422. A glass rod section 426 has an end 428 terminating at a gap 429 defined between an end 430 of glass rod 424 and the end 428 of glass rod 426. The rod section 426 extends into a storage unit 432 such as a solid concrete unit. The rod section 426 is adapted to convey and emit the light into an inside of the storage unit 432 wherein the light converts into heat upon impact with the storage unit 432 to heat the storage unit 432. As described above, the glass rod sections are rotatably relative to one another at the gaps so that the system 400 can follow the path of the sun.

Figure 10:
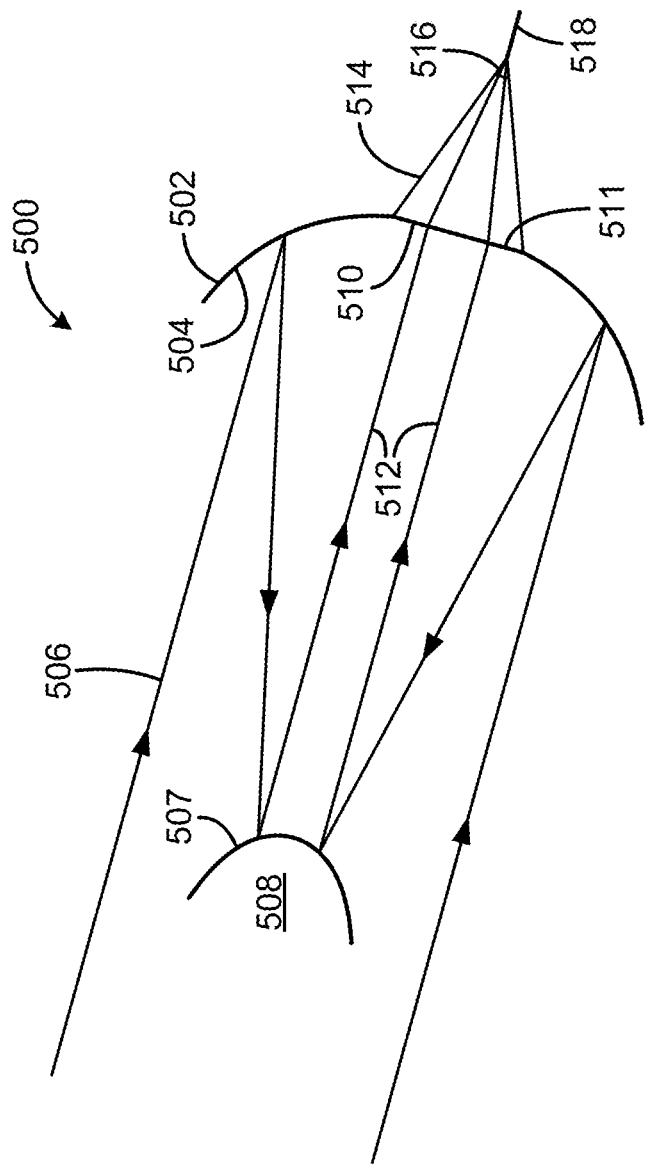
FIG. 10 is an elevational side view of a fourth embodiment of the present invention.

FIG. 10 shows the system 500 that has a parabolic reflector such as a mirror 502 with a concave inside 504 that receives and reflects the sunrays 506 to a convex outside 507 of another parabolic reflector 508 such as a parabolic or curved mirror. In other words, mirror 502 reflects the sunrays to secondary mirror 508. This mirror 508 can be convex, concave or flat. The mirror 508 can have a shape of paraboloid, ellipsoid or another suitable shape. This also applies to the convex parabolic mirrors shown in FIGS. 11, 12 and 13. A convex shape is preferred but other shapes are also possible to use. One advantage of using system 500 compared to system 100 (shown in FIGS. 1A-1B) is that the combination of the parabolic mirrors 502 and 508 further concentrates the incoming sunrays with a factor of up to 25. The curved outside 507 of the parabolic mirror 508 is, preferably, placed at or near a focal point of the parabolic mirror 502. The parabolic mirror 502 has a center section 510 that, preferably, has a lens 511 disposed therein. The mirrors 502 and 508 are, preferably, placed relative to one another so that the sun rays that are reflected by the mirror 502 into the mirror 508 and back to the mirror 502 through the lens 511 (such as a Fresnel lens) as parallel beams 512. One advantage of making the beams parallel is that it is possible to use lens 511 to further concentrate the sun rays before they hit the taper device 516 (also identical to taper device 200), as described in more detail below. The parallel beams 512 penetrate the lens 511 and into a solar concentrator 514 that is substantially similar to the solar concentrator 102 shown in FIGS. 1A-1B and the description thereof applies to solar concentrator 514 also. Solar concentrator 514 is therefore not described in detail here. The concentrator 514 has a taper device 516 at the bottom thereof (or at the focal point of the lens 511) that is identical to tapering device 200 shown in FIGS. 1A-1B so it is not described in detail here. The taper device 516 is connected to an end of a glass rod 518.

Figure 11:
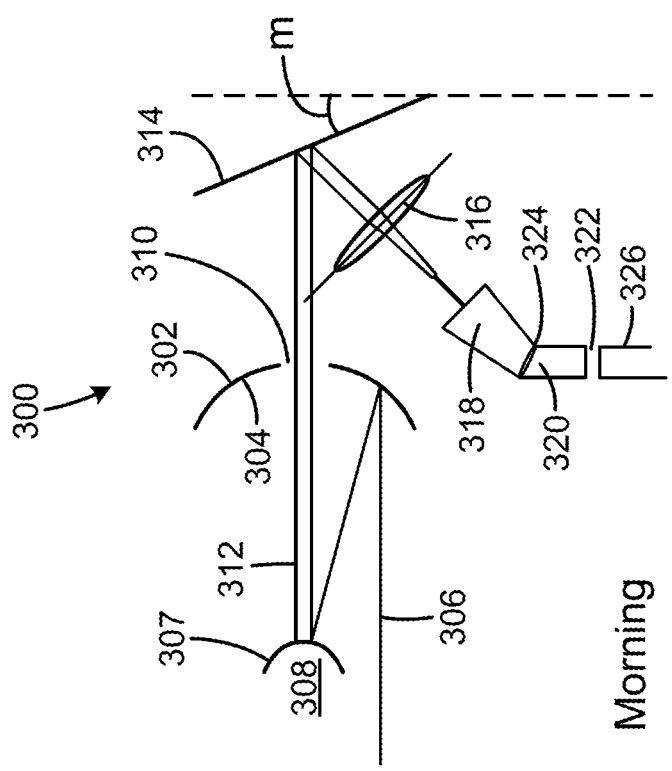
FIG. 11 is an elevational side of a fifth embodiment of the present invention that is adjusted for early morning sun.

FIG. 11 shows the system 300 that has a parabolic reflector such as a mirror 302 with a concave inside 304 that receives and reflects the sunrays 306 to a convex outside 307 of another parabolic reflector such as a mirror 308. As described in detail below, one important advantage of system 300 is that it only requires one rotation point or gap in the glass rod system that is connected to the tapering device because the extra mirror is instead connected to a rotation point that moves the mirror 314 and the parabolic mirror 302 in the vertical direction to adjust to the changes of the vertical position of the sun as it moves from sunrise to sunset (as described in detail below).

The curved outside 307 of the parabolic mirror 308 is preferably placed at or near a focal point of the parabolic mirror 302. The mirror 308 may also be in front or behind the focal point depending on the type of secondary mirror that is used. The parabolic mirror 302 has a center section 310 that is either transparent or open. The mirrors 302 and 308 are placed relative to one another so that sun rays, that are reflected by the mirror 302 into the mirror 308 and back to the mirror 302 and through the center section 310, are parallel beams 312. The parallel beams 312 penetrate the center section 310 and into an angular straight reflector such as a mirror 314 that is placed at an angle (m) relative to a vertical line to reflect the beams 312 into a lens 316 that further concentrates the beams 312 into a conical taper device 318 (identical to taper device 200) placed at an end a glass rod 320, as explained in detail above. The mirror 314 is connected to a rotation mechanism at rotation point 328 to vertically adjust the relative movement of the mirror 314 and the parabolic mirrors 302 and 308. The taper device 318 is preferably the same as the taper devices described above so that all the features of taper device 200 also apply to taper device 318. It is also possible to direct the beams 312 concentrated by lens 316 directly into an end of the glass rod 320 without first passing through the taper device 318. Preferably, the glass rod 320 is connected to the taper device 318 at an angle that is greater than 90 degrees but smaller than 180 degrees, such as at about 135 degrees or so. There is a rotational gap 322 at a first elevational rotation point below the angle section 324 so that the components of system 300 above the rotational gap 322 may rotate relative to the glass rod 326 to adjust sideways to the azimuth movement of the sun. The gap 322 is preferably identical to the gaps 118, 126 and other gaps described above.

Figure 12:
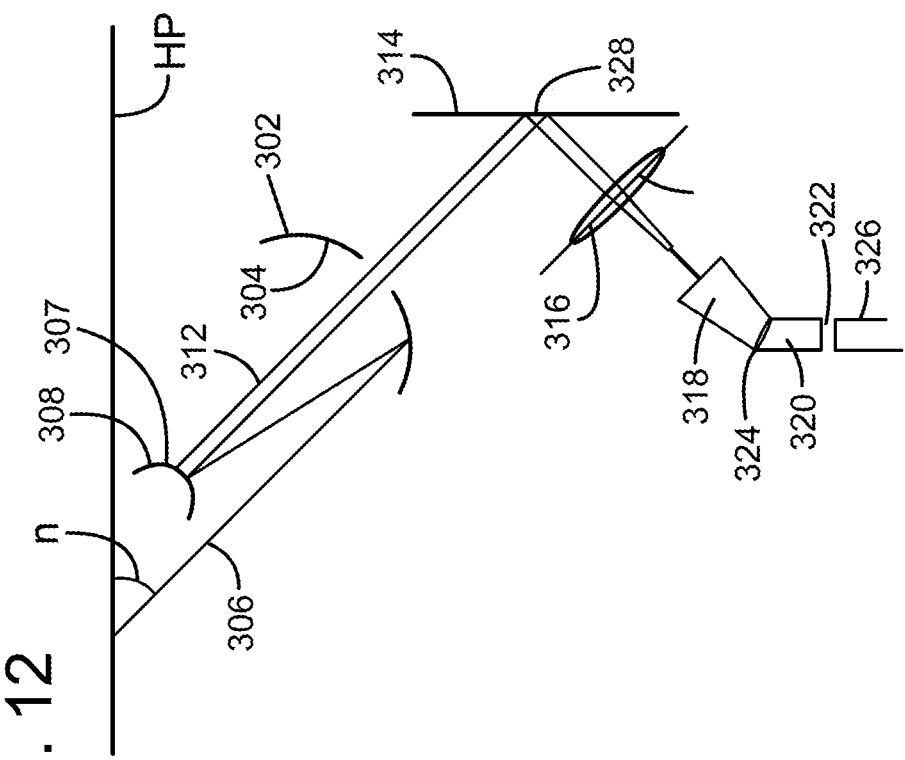
FIG. 12 is an elevational side of the fifth embodiment of the present invention shown in FIG. 11 that is adjusted for mid-morning or mid-afternoon sun.

FIG. 12 shows the system 300 being adjusted to sun rays 306 are at an angle (n) relative to a horizontal plane (HP) that is about 45 degrees. It should be noted that when angle (n) has changed from about 0 degrees in FIG. 11 to 45 degrees in FIG. 12, the angle (m) has only changed from about 22.5 degrees in FIG. 11 to 0 degrees in FIG. 12. In other words, angle (m) changes at about half the rate of angle (n) when mirror 314 is rotated about a second elevational rotational point 328 to adjust for the changing angle of the sun (i.e. morning, mid-day, afternoon sun) relative to the horizontal plane (HP) of the sun rays 306 coming in from the sun.

Figure 13:
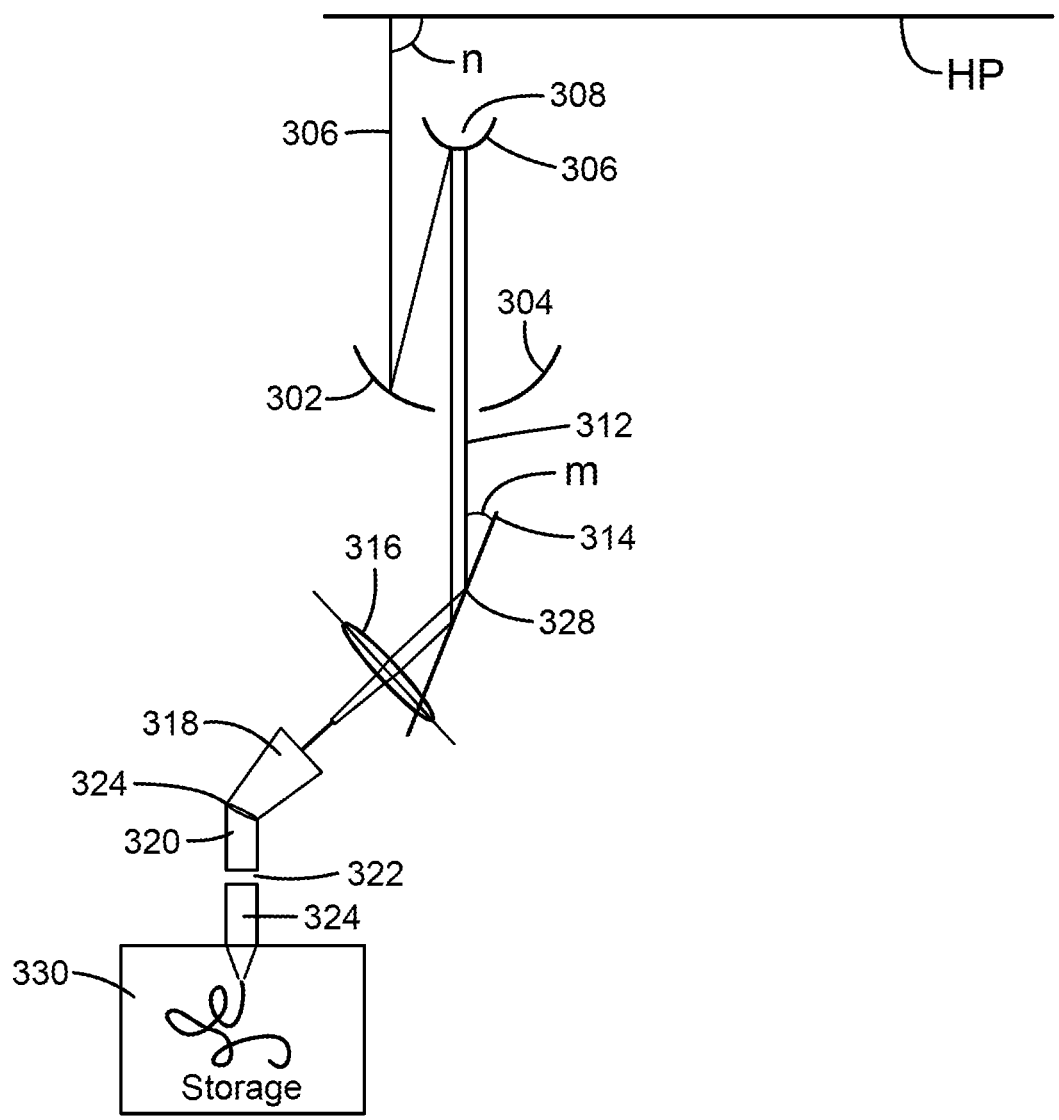
FIG. 13 is an elevational side of the fifth embodiment of the present invention shown in FIG. 11 that is adjusted for the sun being in zenith.

FIG. 13 shows the system 300 adjusted to the position when the sun is in the zenith position i.e. when angle (n) is 90 degrees. This means angle (m) has changed from 0 degrees to −22.5 degrees compared to the position shown in FIG. 12. In other words, the angle (n) has changed from +22.5 degrees to −22.5 degrees as measured from the morning (FIG. 11) to when the sun is in zenith (FIG. 13). One important feature of the system 300 is that only one rotation point or gap 322 is needed in the glass rod 320 because the vertical changes of the sun during the day is adjusted to at the rotational point 328. This makes it possible to make glass rod 326 very short which is advantageous because glass rods are generally very expensive. The glass rod 326 can, therefore, be connected into a storage unit 330 without requiring any additional rotational points in addition to the rotational point at gap 322.

Figure 14:
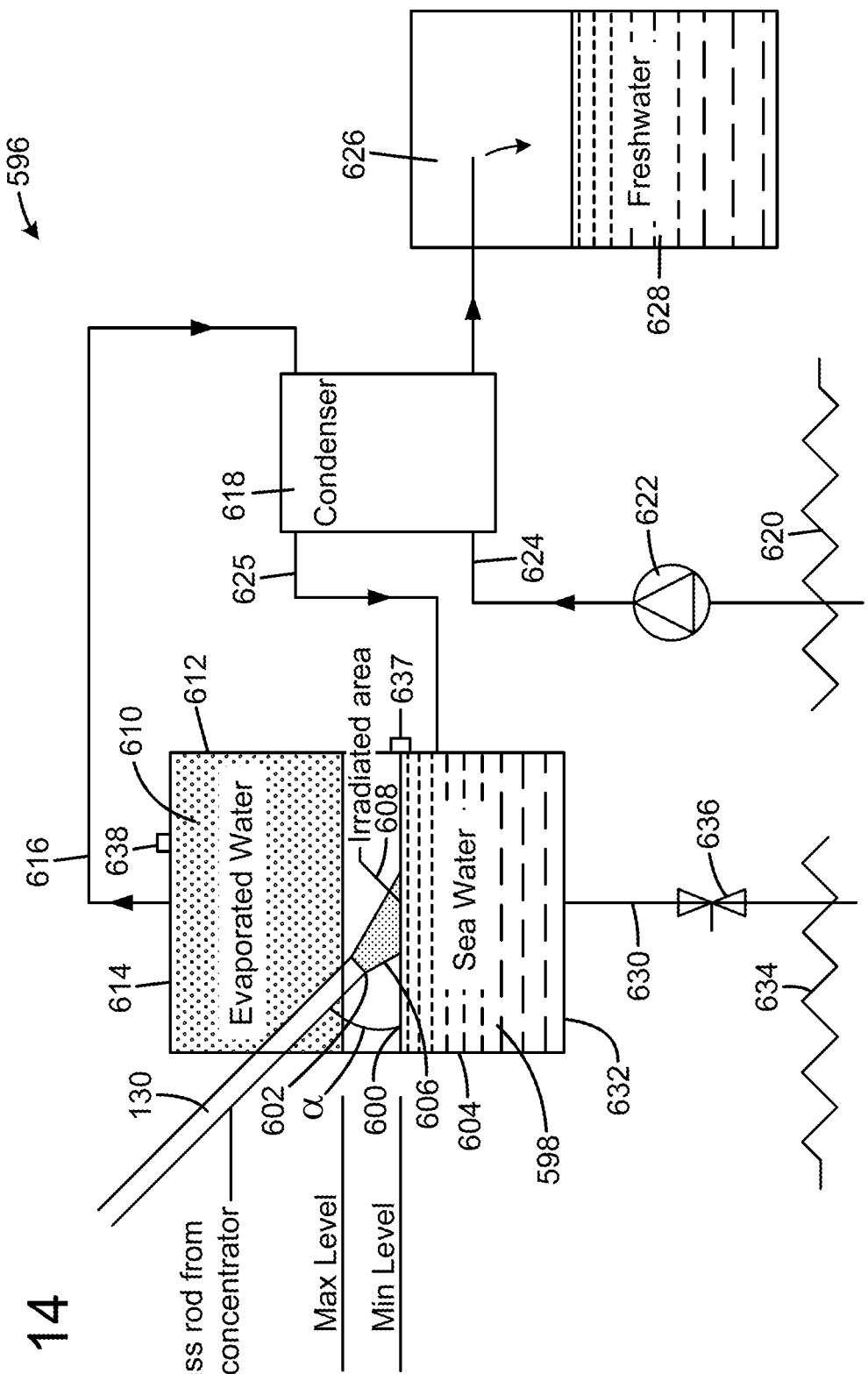
FIG. 14 is an elevational cross-sectional side view of a sixth embodiment of the present invention.

FIG. 14 is an elevational cross-sectional side view of a sixth embodiment 596 of the present invention. FIG. 14 may be seen as a variation of the embodiments of FIGS. 1A-1B and 3 in that instead of connecting glass rod 130 to a spiral-shaped rod 154 inside a storage unit 132, the rod 130 terminates at a water surface 600. The sixth embodiment thus preferably includes all the features shown in FIGS. 1A-1B and 3 such as the solar concentrator 102, tapering device 200 and the various rotatable loop sections so that the solar concentrator can follow the path of the sun, as described in detail above.

The end 602 of rod 130 preferably terminates slightly above the water surface 600 of water 598 but may also terminate slightly below the water surface 600 of a container 604. Preferably, the end should be between 0-3 centimeters above the surface 600. More preferably, the end should be 1 millimeter-2 centimeters and most preferably between 3 millimeters-1 centimeter above the surface 600. The end 602 may also be positioned slightly below water surface 600 down to about a couple of millimeters to about one centimeter or so below the surface 600. When the end 602 is too low i.e. below 10 centimeters, the instant evaporation stops and the ends starts to heat the water without the instant evaporation.

The container 604 may contain sea water 598 or any other type of water or liquid that needs to be heated. The container 604 has a conduit 630 at a bottom 632 thereof that is in fluid communication with sea water 634 via a valve 636. Preferably, the end 602 should terminate between a Min Level and Max Level of the water surface 600 for the best efficiency. The light 606 from rod 130 is dispersed or spreads out before the light hits the water surface 600 so that an irradiated area 608 is formed on the water surface 600 where the energy in the light is, upon impact with the water surface, converted to heat. The rod 130 may be positioned at an acute or right angle (a) relative to the water surface 600. When the rod 130 is perpendicular to the water surface 600 it may be positioned a bit further away from the water surface and still instantly convert the water to steam because the irradiated area 608 is smaller. In a way, the size of the irradiated area 608 determines how far away the end 602 may be as long as the light 606 is able to convert the water to steam upon impact. The rod 130 may have a diameter of six millimeters but it can be thicker or thinner as desired. For example, the rod 130 could also be between 2-10 millimeter.

When the light 606 heats the water surface 600, the water 598 at the water surface 600 almost immediately evaporates to steam 610 at the upper end 612 of the closed container 604. It is like a welding torch hitting the water surface so that within the irradiated area 608 the water instantly starts to boil and is converted to steam. Upon impact of the light 606 on the water surface 600, the effect of the light is very powerful because all the energy in the light is converted to heat when it hits the surface so that water as low as one decimeter below the surface evaporates. The light 606 may generate heat up to 3000° C. when it hits a material that can handle such temperatures. However, water is limited to about 100° C. at atmospheric pressures and upon impact of the light from rod 130 the water surface and a section below the water surface start to boil and convert to steam at the irradiated area 608. Most if not all the energy has been converted to heat about 10 centimeters below the surface so the heating of the water below this level is marginal. An important feature is that it is not necessary to heat all the water 598 in container 604 to produce steam, the water immediately evaporates in the irradiated area 608 and perhaps about one decimeter below the water surface 600 while the water in the rest of the container 604 remains relatively cool or at a temperature similar to the temperature of the source water 634. Preferably and in general, the end 602 should be placed relative to the water surface 600 to maximize the amount of steam 610 generated by the light 606.

The upper surface 614 of container 604 has a conduit 616 connected thereto that is in fluid communication with the steam 610 to convey the steam away from the container 604 to a heat exchanger 618 so that the heated from steam 612 conveyed in conduit 616 may be exchange with and transferred to another liquid such as to heat water 620 that is pumped by a pump 622 in a conduit 624 via heat exchanger 618 to terminate in a container 626 that contains fresh water 628 that has been heated by the steam 610 in the heat exchanger 618. It may also be possible to heat air or any other media with the steam 610.

The container 604 has a conduit 630 connected to the bottom thereof so that the container may be emptied and waste products and other products such as salt may be removed from container 604 by opening and closing valve 636. The container 604 may be continuously refilled via conduit 624 and branch conduit 625 so that the water surface 600 remains the same despite the fact that water continuously evaporates when exposed to the light energy. The pump 622 may be in operative engagement with a surface level sensor 637 that senses the level of the water surface 600 to ensure that the water surface 600 is kept between the Min level and the Max level. The water level is thus controlled by turning on and off pump 622. More preferably, the sensor 637 should keep the water surface 600 at a level where the maximum amount of steam 610 is generated. When the water level is below the Min level, the irradiated area 608 is too wide and the heating effect is not optimal. The Min level may represent the lowest level where the light 606 converts the water to steam. Similarly, when the water level is above the Max level, the end 602 is too far below the water surface 600 to provide the most optimal heating efficiency.

It is also possible to use a plurality of glass rods 130. There may also be a sensor 638 that measures the amount of steam 610 so that the level of the water surface 600 and the angle α of the glass rod 130 is adjusted so that the maximum amount of steam is generated.

While the present invention has been described in accordance with preferred compositions and embodiments, it is to be understood that certain substitutions and alterations may be made thereto without departing from the spirit and scope of the following claims.

We claim:

1. A solar power system, comprising, a solar concentrator having a lens disposed therein, the solar concentrator having a first cone-shape and a bottom, the solar concentrator having a length (l) that is longer than a width (w) at the lens of the solar concentrator;

a solid tapering device disposed at the bottom, the tapering device having a second cone-shape;

the tapering device having a truncated bottom surface connected to a first curved glass loop section of a glass rod, the glass rod having a second curved glass loop section and a straight section, the first curved loop section having a first end surface, the second curved loop section having a second end surface, the straight section having a third end surface, the first end surface and the second end surface having a first gap defined therebetween, the second end surface and the third end surface having a second gap defined therebetween;

the solar concentrator being adapted to receive solar power as rays and conveying and concentrating rays as light towards a focus line or segment at the tapering device, the tapering device being in communication with an upper end of the first curved glass loop section, the first curved glass loop section conveying the light to the second curved glass loop section via and across the first gap, the second curved glass loop section conveying the light to the straight glass section via and across the second gap, while transmitting light, rotating the first curved glass loop section relative to the second curved glass loop section at the first gap;

rotating the second curved glass loop section relative to the straight glass section at the second gap so that the solar concentrator follows a path of a sun; and placing an outer end of the straight glass section at a water surface to heat the water below the water surface.

2. The solar power system according to claim 1 wherein the outer end is placed above the water surface.

3. The solar power system according to claim 2 wherein the outer end is placed above the water surface of water contained in a container.

4. The solar power system according to claim 3 wherein light emitted from the outer end converts the water to steam that is conveyed from the container.

* * * * *

UNITED STATES PATENT AND TRADEMARK OFFICE
CERTIFICATE OF CORRECTION

| | |
|---|---|
| PATENT NO. | : 10,557,647 B2 |
| APPLICATION NO. | : 15/687864 |
| DATED | : February 11, 2020 |
| INVENTOR(S) | : Kenneth Nordin and Mats Olof Erik Mattsson |

Page 1 of 1

It is certified that error appears in the above-identified patent and that said Letters Patent is hereby corrected as shown below:

On the Title Page

Item (73) should read:
Rodluvan Inc. (Southern Pines, NC)

Signed and Sealed this
Fifth Day of May, 2020

Andrei Iancu
*Director of the United States Patent and Trademark Office*